Jan. 8, 1957 E. J. HOUDRY 2,776,875
CATALYTIC APPARATUS FOR EXHAUST GAS TREATMENT
Filed Nov. 3, 1952
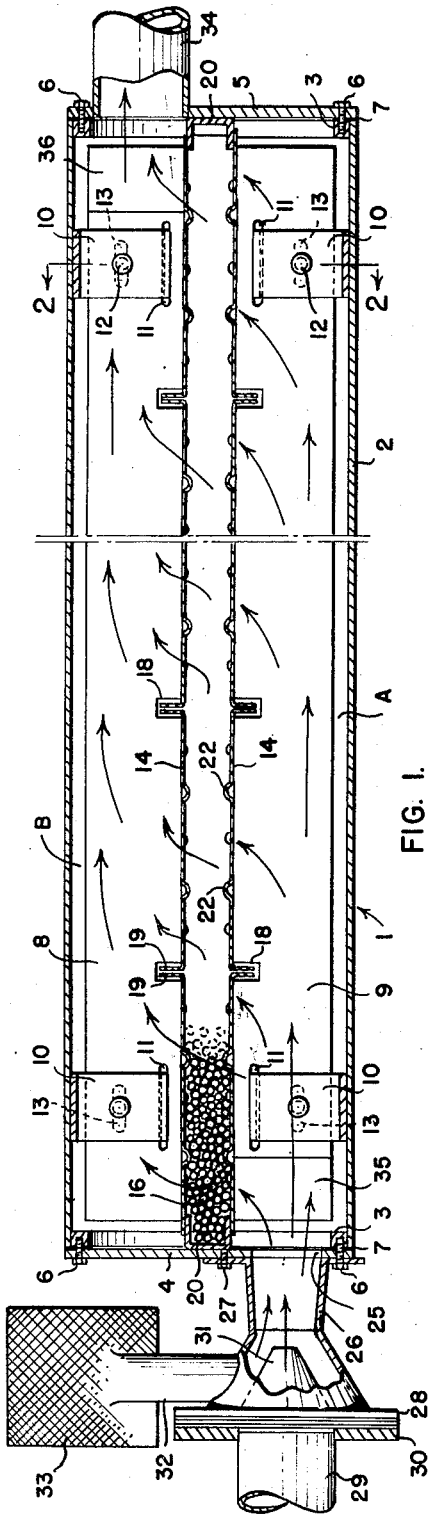
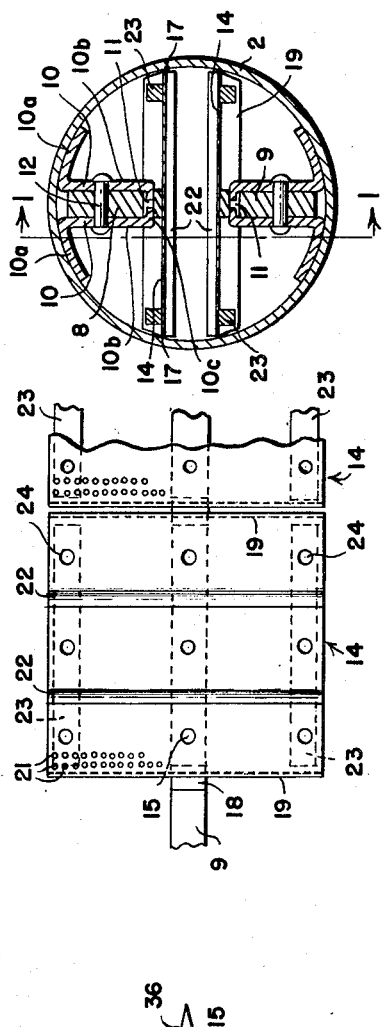
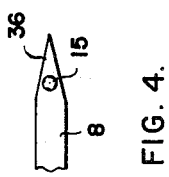
INVENTOR.
EUGENE HOUDRY
BY
ATTORNEY United States Patent Office 2,776,875
Patented Jan. 8, 1957

2,776,875

CATALYTIC APPARATUS FOR EXHAUST GAS TREATMENT

Eugene J. Houdry, Ardmore, Pa., assignor to Oxy-Catalyst, Inc., a corporation of Pennsylvania Application November 3, 1952, Serial No. 318,382

7 Claims. (Cl. 23—288)

This invention is concerned with apparatus for carrying out catalytic reactions, and in particular, is concerned with a catalytic exhaust cleaner for internal combustion engines which is suitable for attachment to the exhaust manifold of such engines for the elimination of the toxic and obnoxious components of exhaust gases by catalytic oxidation.

The use of catalytic oxidation as a means for cleaning the exhaust fumes of an internal combustion engine is, of course, not a new idea. Many suggestions as to how this might be accomplished have been made. However, because of the many difficulties involved in providing a proper type of oxidation catalyst, and of providing a practical means for supporting this catalyst in a container of reasonable dimensions, making due allowance for avoiding excessive back pressure on the engine, providing proper contact between the exhaust gases and the catalyst, and other factors which are necessary to consider, most of the prior suggestions have not proved commercially successful.

Where the catalyst is employed in particle form, such as in pellets of ⅛" or 1/16" diameter, the problem of designing a container for properly supporting the catalyst particles is a particularly difficult one. To avoid excessive pressure drop, the catalyst must be disposed in a relatively thin layer, and in such manner that there is no by-passing of the catalyst bed. Due regard must be had for the space limitations involved, and preferably the housing for the catalytic exhaust cleaner should be approximately of the size and shape of a conventional muffler for an internal combustion engine. In commercial practice, the exhaust cleaner would replace the muffler, performing the double function of noise elimination and fume elimination.

Because of the continuous mechanical shock to which the exhaust cleaner is exposed while in service on the road, obviously it must be rugged in design. It is particularly important that the catalyst container be securely supported within the exhaust cleaner housing, so that it does not become warped or misshapen under severe operating conditions. Distortion of the catalyst container is inadmissible since this would result in damage to or loss of catalyst particles and by-passing of the exhaust gases past the catalyst bed.

Rigid support of the catalyst container within the housing is complicated by the large variations in temperature which exist at various times at different localities in the exhaust cleaner. The oxidation of the carbon monoxide and hydrocarbons contained in the exhaust gases is, of course, an exothermic reaction, and since heat is liberated in the catalyst bed, the portion of the cleaner adjacent the catalyst bed tends to be at the highest temperature. The external housing, which is usually constructed of sheet metal stock is generally the coolest part of the container, and in fact is preferably so designed as to act as an efficient medium for the transfer of the reaction heat to the surrounding atmosphere. When the exhaust cleaner is elongated in shape, as it ordinarily is, there is usually a wide temperature variation along the length of the container, the outlet end generally being at a higher temperature than the inlet.

Because of these constantly shifting, wide variations in temperature, irregular and constantly varying stresses are set up continuously in various portions of the cleaner structure occasioned by differences in degree of expansion and contraction of the various parts. These stresses tend to distort the entire structure and to cause dislocation and distortion of the catalyst container.

The object of the present invention is to provide an exhaust cleaner structure which is adapted for use with a particulate catalyst, which provides rigid support for the catalyst container, which is sufficiently rugged mechanically to withstand the mechanical shocks connected with road service, and which is so designed that it remains free from distortion caused by differential expansion and contraction of the various components thereof. The nature of the invention, and other objects thereof, will be apparent from the description which follows, and from the accompanying drawings, reference to which is now made.

In the drawings Fig. 1 is a cross-sectional view, with some parts in plan, of an exhaust cleaner constructed in accordance with the invention, taken on the line 1—1 of Fig. 2; and, Fig. 2 is a cross-sectional view taken on the line 2—2 of Fig. 1; and, Fig. 3 is a top plan view of a foraminous tray, and a portion of another, which is employed in the apparatus illustrated in Figures 1 and 2; and, Fig. 4 is a top plan view of the streamlined end portion of a supporting beam employed in the device illustrated in Figures 1 and 2.

Referring to Figures 1 and 2, the reference numeral 1 indicates generally a housing. In the embodiment shown, the housing consists of an elongated cylinder 2, open at both ends. At each end, an inwardly projecting flange 3 is provided, which may be bolted or welded to the cylinder or formed integrally therewith. The housing is completed by end plates 4 and 5 which are bolted to flanges 3 by bolts 6. A gasket 7 of suitable temperature resistant material is interposed between the end plates and their flanges.

Arranged within the housing are a pair of rigid beams 8 and 9 which extend longitudinally of the housing in parallel spaced apart relation. Beams 8 and 9 are carried from the cylindrical portion 2 of the housing 1 by a series of straps 10. As may be best seen in Figure 2, straps 10 are arranged in pairs, with each pair straddling a beam. Straps 10 are generally L-shaped in configuration with one portion 10a rigidly fastened by welding, bolts, or other suitable means to the cylindrical portion 2 of the housing. The other portion 10b embraces the beam snugly, and has its end bent inwardly as at 10c toward the other strap of its pair. These inwardly bent portions engage slots 11 provided in beams 8 and 9. A fastener 12 which may be a rivet, or bolt, or other suitable fastening means, passes through the straps 10 and a slot 13 provided in the beam and serves to hold the straps 10 in snug engagement with the beam. In the installation of fastener 12, care is taken to draw the straps 10 in snug engagement with the beam but to leave sufficient play so as to permit independent longitudinal motion of the beam relative to the straps during expansion and contraction of the beams. It will be noted that the slots 11 are of somewhat greater width than the straps 10 so that inwardly bent portions 10c do not interfere with this independent motion. Likewise, slots 13 in the beams (see Fig. 1) for accommodating fasteners 12 are of greater width than the fasteners.

To the opposing faces of beams 8 and 9 foraminous trays 14 are fastened by screws or rivets 15 as may be best seen in Figures 2 and 3. Trays 14 extend substantially the entire length and width of the housing and provide between them a space for receiving a layer of catalyst particles 16. It is understood that the entire space between the trays is filled with catalyst, but that for clarity of illustration, only a portion of the catalyst bed has been illustrated. As may be best seen in Fig. 2, the lateral edges 17 of the trays extend close to the walls of the cylindrical portion of the housing so as to prevent catalyst particles from escaping between these lateral edges and the housing. In this fashion, the housing itself forms the lateral walls of the catalyst container. Care should be taken not to permit tight contact between the lateral edges of the trays and housing so that the trays may expand and contract independently of the housing.

It will be noted that the foraminous trays are divided into sections in such manner that each section may expand and contract with the beam independently of the others. Beams 8 and 9 are provided with notches 18 and trays 14 are provided with end flanges 19 which are accommodated by the notches 18 as illustrated. Flanges 19 are so arranged in the slots that they are spaced from the walls of the slots and from each other as shown.

To close off the catalyst space at either end of the housing, U-shaped members 20 are provided, permanently attached to end plates 4 and 5 respectively by welding or other suitable means. The U-shaped members 20, which extend across the width of the housing, fit between, and slidably engage the straight end portions of the trays at either end of the housing. Due to the sliding engagement between the trays and the U-shaped members 20, the end trays are free to undergo independent movement relative to elements 20 during expansion and contraction.

The trays 14 may be of any desired construction. In the embodiment shown, they are formed of sheet metal and provided with a number of closely spaced perforations 21 over the entire surface thereof. In Fig. 3, only a few of these perforations are illustrated. To provide rigidity, trays 14 are provided with one or more stiffening ribs 22 which may be readily formed in the tray by a stamping operation. As illustrated, the ribs 22 extend transversely of the tray. To provide further stiffness, stiffening bars 23 are fastened by screws or rivets 24 along each side of the tray. If desired, stiffening bars 24 may be replaced by stiffening ribs similar to ribs 22, stamped into the tray. With these stiffening means, and the further stiffening effect provided by the flanges 19, trays 14 may be constructed as relatively rigid, self-supporting units. They are preferably formed of stainless steel sheet metal stock.

As can be seen, trays 14 divide the interior of the housing into two chambers A and B, separated from one another by a relatively thin layer of catalyst. Communicating with the lower chamber A, as viewed in the drawings, an inlet opening 25 is provided. Connected to the inlet opening is a flanged pipe 26 which is connected to the end plate 4 by bolts 27. As can be seen, pipe 26 has a converging portion and a diverging portion (from right to left as viewed in the drawings) connected thereto, the diverging portion being provided with a flange 28. A pipe 29 provided with a flange 30 is bolted or otherwise attached to flange 28. Projecting beyond flange 30, pipe 29 is provided with a nozzle portion 31 which projects within the diverging portion of pipe 26 toward the throat between its convergent and divergent portions. To the divergent portion of pipe 26 an air inlet pipe 32 is provided capped with an air filter 33. When pipe 29 is connected to the exhaust manifold of an internal combustion engine the device illustrated functions as an air inspirator operating on the venturi principle, air being drawn into pipe 26 from the atmosphere through air inlet 32 due to the momentum of the exhaust gases passing through nozzle 31 into the housing 1.

Communicating with the upper chamber, as viewed in the drawings, is an outlet pipe 34 for the removal of gases from the housing after passing through the layer of catalyst therein.

In order to minimize turbulence and back pressure caused by the gases entering through inlet 25 passing over the edge of beam 9, the end of the beam is preferably bevelled as at 35 to provide a stream-lined shape. The end of beam 8 opposite the outlet pipe 34 is likewise preferably similarly bevelled as at 36 (see Fig. 4) to minimize turbulence at this point.

In operation, exhaust gases from an internal combustion engine whose oxidizable components it is desired to convert into harmless inert gases, pass through pipe 29, nozzle 31, and pipe 26 into the lower chamber of the exhaust cleaner. As previously explained, atmospheric air is simultaneously sucked into the stream of exhaust gases through air inlet 32, and mixing with these gases, passes into the lower chamber A. Since at idle and low speeds of the engine, the percentage of combustibles in the exhaust gases is much higher than at higher engine speeds, it is necessary to control the ratio of the weight of air to exhaust gases in such manner that at low engine speeds the weight ratio of air to exhaust gases will be relatively high (in most cases preferably of the order of 80 to 100% by weight of air based on exhaust gases) and so that as the engine speed progressively increases, the ratio of air to exhaust gases will progressively decrease. Preferably, at full load the amount of air mixed with the exhaust gases should not exceed about 30% by weight. If this control is not exercised, there will be insufficient air to completely oxidize the combustible components at idle and low speeds of the engine, or at higher speeds, the cooling effect of the excess air will cause the temperature of the catalyst to fall below that at which it maintains its activity.

Automatic control of the weight ratio of air to exhaust gases may be very readily exercised by standardizing the size of the air inlet pipe 32 and then controlling the size of the outlet pipe 34. Everything else being equal, the smaller the outlet pipe 34, the greater will be the progressive decrease in the weight ratio of air to exhaust gases as the engine speed increases. This is due to the fact that decreasing the size of the outlet orifice produces a greater proportional increase in back pressure through the system at higher engine speeds (i. e. at high gas velocities) then it produces at lower engine speeds. An increase in back pressure, of course, lowers the pressure differential between the low pressure zone of the inspirator and the atmosphere, and this consequently results in a smaller amount of air being sucked in, and accordingly a lower ratio of air to exhaust gases.

The mixture of air and exhaust gases flow into the lower chamber A and distribute themselves along its length. The gases pass upwardly through the foraminous trays 14 and through the relatively thin layer of catalyst contained between them. In the presence of the catalyst particles 16, the oxidizable constituents of the exhaust gases combine with the oxygen of the air and undergo oxidation; carbon monoxide is converted to carbon dioxide, and hydrocarbons are converted to carbon dioxide and water. These harmless constituents, together with the non-oxidizable constituents of the gases such as nitrogen and excess oxygen, flow into the upper chamber B and pass out of the exhaust cleaner through pipe 34 to the atmosphere.

Any suitable oxidation catalyst, capable of operation at temperatures in the range of about 500° F. to 1300° F. may be employed. It is understood of course that the invention is not limited to any particular kind of catalyst. One type of catalyst which has been found to be particularly suitable, however, consists of pellets of activated alumina 1/8" or 1/16" in diameter, and of about the same length, impregnated with about .4% by weight of platinum. The platinum impregnation may be accomplished by immersing the pellets in a 1% solution of platinum chloride for about 10 minutes, draining, and then decomposing the platinum chloride by heat at about 1100° F.

to leave the metallic platinum deposited upon the alumina. Preferably, the catalyst container is maintained substantially full of catalyst particles so as to avoid by-passing. However, care should be taken not to pack the catalyst into the container too tightly since this would result in crushing the catalyst particles during the expansion and contraction accompanying changes in temperature.

Using 1/8" or 1/16" diameter pellets, the depth or thickness of the catalyst bed should not exceed about 1" in order to avoid too great a back pressure on the engine. Using the platinum-on-alumina catalyst described above, in 1/8" pellets, about 10 grams of catalyst are required for each cubic inch of piston displacement. Using a 1/16" diameter pellet, about one half of this amount of catalyst is required.

This type of catalyst has an activation temperature of about 500° F., that is at a minimum temperature of 500° F., the catalyst is effective in promoting oxidation of oxidizable constituents of the exhaust gases. Its most effective operating temperature range is on the order of 900° F. to about 1200° F., but it may operate as high as 1800° F. without substantial impairment of its activity. With this type of catalyst, for maximum efficiency, the temperature of the catalyst bed should be maintained of the order of about 1100° F. or 1200° F. Temperatures of this order may be maintained fairly consistently by the proper adjustment of the ratio or air to exhaust gases at varying speeds of the engine in the manner previously described, and by proper adjustment of the area of the metal housing relative to the volume of catalyst enclosed. By conduction and radiation, the housing tends to dissipate the heat generated in the catalytic oxidation reaction, and by proper design of the housing, a good deal of control over the temperature in the catalyst bed can be obtained.

As mentioned previously, during operation, there are wide variations in temperature in the different portions of the cleaner structure. In normal operation, for example, the catalyst bed may be at a temperature of 1100° F., while the temperature of the exterior skin of the housing may vary from 250° F. to 750° F. The average temperature at the inlet end of the cleaner is usually lower than the average temperature at the outlet, and still again, the average temperature in the lower chamber A of the housing will generally be lower than the average temperature in the upper chamber B. These non-uniform temperature conditions undergo constant variation due to the constant variation in the inlet temperature and composition of the exhaust gases, and consequently many parts of the structure undergo expansion and contraction in different degrees, and in a different rhythm than other parts. For example, one end of the beams 8 and 9 may be increasing in temperature and therefore undergoing expansion, while at the same time the other end may be cooling and consequently undergoing contraction. There is consistently a wide variation in the degree and rhythm of expansion and contraction as between the beams 8 and 9 and the housing from which they are supported. With the arrangement provided by the invention, the catalyst container is rigidly supported within the housing and is able to withstand severe and constant mechanical shock without distortion or displacement. At the same time, the rigid supporting members, that is the elongated beams, are carried by the housing in such a manner that they may expand and contract substantially independently of the housing. If a portion of either beam, or the entire beam should expand and contract at a different rate than the housing by which it is carried, relative movement occurs between the beam and the supporting straps, the inwardly bent portions 10c of the straps serving as guides during this relative longitudinal movement. Furthermore, each section of the total area of the foraminous trays serving as the catalyst support is free to expand and contract with the beam independently of the others. Thus, if one end of either of the supporting beams should expand or contract more rapidly than the other end, there would be virtually no stress set up in the relatively small tray section fastened to this portion of the beam.

In the embodiment shown, catalyst particles may be readily introduced into the catalyst space by removing the rear end plate 5 to which is attached the U-shaped member 20. This leaves the space between trays 14 open at one end for the insertion or removal of catalyst. With this type of arrangement, the replacement of catalyst, after the original charge has become deactivated, may be easily and quickly accomplished.

It is of course apparent, that many variations in the structure illustrated may be made within the spirit of the invention. For example, other means of supporting the beams so as to permit the contraction and expansion thereof independently of the housing may be employed. For example, instead of employing pairs of straps as illustrated, continuous straps may be used which are passed through similar slots in the beams, or which are simply passed under the beams. Furthermore, the beams may be supported from the end plates rather than from the cylindrical portion of the housing by means of studs projecting from the end plates and fitting slidably into bores provided in the ends of beams 8 and 9.

Likewise, other types of catalyst containers than that illustrated may be employed. For example, the catalyst may be disposed in a replaceable cartridge adapted to be inserted between, and supported by, the supporting beams. Likewise, means for continuously feeding fresh catalyst into the catalyst bed may be employed to replace catalyst lost by attrition. If desired, instead of one bed of catalyst, two or more may be employed disposed within the same housing in spaced-apart parallel relation. For example, two pairs of foraminous trays may be employed, each pair supported on opposite edges of a beam running the length of the housing, the two beams being spaced apart and parallel as in the embodiment illustrated in the drawings. With this arrangement the width of the beam defines the thickness of the catalyst layer and the beam occupies the center portions of each catalyst bed. The space between the two layers of catalyst, corresponding to the distance the beams are spaced apart, may serve as an inlet chamber for the admission of the mixture of air and exhaust gases, this mixture flowing simultaneously from this inlet chamber through the layers of catalyst on either side, and thence into the outlet chambers adjacent the outer walls. In this manner approximately twice the volume of catalyst may be disposed in a housing of the same length and width.

Other variations within the scope of the invention will be apparent to those skilled in the art, and it is not intended that the invention be limited by the foregoing description, but only as by the scope of the claims which are appended.

I claim:

1. Catalytic apparatus suitable for attachment to the exhaust outlet of an internal combustion engine for oxidizing toxic and obnoxious components of exhaust gases therefrom comprising an elongated housing, catalyst containing means in said housing, rigid supporting means for said catalyst containing means comprising elongated rigid beams extending longitudinally of said housing, said beams being carried from said housing by straps rigidly fastened to said housing at one end and positively fastened to said beams at the other end so as to retain said beams against displacement relative to said housing in all directions but in such manner as to permit expansion and contraction of said beams independently of said housing and of said straps.

2. Catalytic apparatus suitable for attachment to the exhaust outlet of an internal combustion engine for oxidizing toxic and obnoxious components of the exhaust gases therefrom comprising an elongated housing, catalyst containing means in said housing, rigid supporting means for said catalyst containing means comprising elongated rigid beams extending longitudinally of said housing, said beams being carried from said housing by straps rigidly fastened to said housing at one end and positively fastened to said beams at the other end by means of fasteners passing through mated slots in said beams and their associated straps, said fasteners maintaining said beams and straps in snug engagement with one another so as to prevent displacement of said beams relative to said housing in all directions but at the same time permitting expansion and contraction of said beams independently of said housing and of said straps.

3. Catalytic apparatus suitable for attachment to the exhaust outlet of an internal combustion engine for oxidizing toxic and obnoxious components of exhaust gases therefrom comprising a housing, catalyst-containing means arranged within said housing and including spaced-apart, substantially flat foraminous trays extending along and across said housing, and providing between them a space for receiving a layer of catalyst particles, rigid supporting means for said trays comprising at least one elongated rigid beam extending parallel to the surfaces of said trays, each of said trays being rigidly fastened to and supported on a face of its supporting beam, means for suspending said rigid beam in said housing, one end of said suspending means being rigidly fastened to said housing and the other end being connected to said beam, the connection between said suspending means and said beam being arranged to positively retain said beam against displacement relative to said housing in all directions while under the influence of the vibration and motion of the vehicle, said connection including a joint permitting limited sliding motion between said beam and said suspending means in a direction parallel to the length of said beam thereby permitting said beam to expand and contract longitudinally independently of said housing and said suspending means under the influence of varying temperatures experienced during the operation of the exhaust purifier.

4. Catalytic apparatus suitable for attachment to the exhaust outlet of an internal combustion engine for oxidizing toxic and obnoxious components of exhaust gases therefrom comprising a housing, catalyst-containing means arranged within said housing and including a pair of substantially flat foraminous trays arranged in parallel spaced-apart relationship extending along and across said housing, and providing between them a space for receiving a layer of catalytic particles, rigid supporting means for said trays comprising a pair of elongated rigid beams extending parallel to the surfaces of said trays, said trays being rigidly fastened to and supported on the opposed faces of said beams, means for suspending said rigid beams in said housing, one end of said suspending means being rigidly fastened to said housing and the other end being connected to a beam, the connection between said suspending means and said beam being arranged to positively retain said beam against displacement relative to said housing in all directions while under the influence of the vibration and motion of the vehicle, said connection including a joint permitting limited sliding motion between the said beam and said suspending means in a direction parallel to the length of said beam thereby permitting said beam to expand and contract longitudinally independently of said housing and said suspending means under the influence of varying temperatures experienced during the operation of the exhaust purifier.

5. Catalytic apparatus suitable for attachment to the exhaust outlet of an internal combustion engine for oxidizing toxic and obnoxious components of exhaust gases therefrom comprising a housing, catalyst-containing means arranged within said housing and including spaced-apart substantially flat foraminous trays extending along and across said housing and providing between them a space for receiving a layer of catalyst particles, rigid supporting means for said trays comprising at least one elongated rigid beam extending parallel to the surfaces of said trays, said trays being divided into sections, each of said sections being rigidly fastened to and supported on the face of its supporting beam, and each section free to expand and contract independently of the others, means for suspending said rigid beam in said housing, one end of said suspending means being rigidly fastened to said housing and the other end being connected to said beam, the connection between said suspending means and said beam being arranged to positively retain said beam against displacement relative to said housing in all directions while under the influence of the vibration and motion of the vehicle, said connection including a joint permitting limited sliding motion between said beam and said suspending means in a direction parallel to the length of said beam thereby permitting said beam to expand and contract longitudinally independently of said housing and said suspending means under the influence of varying temperatures experienced during the operation of the exhaust purifier.

6. Catalytic apparatus suitable for attachment to the exhaust outlet of an internal combustion engine for oxidizing toxic and obnoxious components of exhaust gases therefrom comprising a housing, catalyst-containing means arranged within said housing and including spaced-apart, substantially flat foraminous trays extending along and across said housing, and providing between them a space for receiving a layer of catalyst particles, rigid supporting means for said trays comprising at least one elongated rigid beam extending parallel to the surfaces of the trays, said trays being divided into sections, each of said tray sections being rigidly fastened to and supported on a face of its supporting beam, said sections being arranged along said beam in closely spaced, side-by-side relationship, the spacing between adjacent tray sections being such that they are in sufficiently close proximite to one another to prevent the escape of catalyst particles therebetween but are sufficiently spaced apart so that each is free to expand and contract independently of the others, means for suspending said rigid beam in said housing, one end of said suspending means being rigidly fastened to said housing and the other end being connected to said beam, the connection between said suspending means and said beam being arranged to positively retain said beam against displacement relative to said housing in all directions while under the influence of the vibration and motion of the vehicle, said connection including a joint permitting limited sliding motion between said beam and said suspending means in a direction parallel to the length of said beam thereby permitting said beam to expand and contract longitudinally independently of said housing and said suspending means under the influence of varying temperatures experienced during the operation of the exhaust purifier.

7. Catalytic apparatus suitable for attachment to the exhaust outlet of an internal combustion engine for oxidizing toxic and obnoxious components of exhaust gases therefrom comprising a housing, catalyst-containing means arranged within said housing and including spaced-apart, substantially flat foraminous trays extending along and across said housing, and providing between them a space for receiving a layer of catalyst particles, the lateral edges of said trays extending in sufficiently close proximity to the walls of said housing so as to prevent the escape of particles therebetween, whereby the catalyst particles are retained by said walls, but being sufficiently spaced therefrom to permit expansion and contraction of said trays independently of said housing, rigid supporting means for said trays comprising at least one elongated rigid beam extending parallel to the surfaces of said trays, each of said trays being rigidly fastened to and supported on a face of its supporting beam, means for suspending said rigid beam in said housing, one end of said suspending means being rigidly fastened to said housing and the other end being connected to said beam, the connection between said suspending means and said beam being arranged to positively retain said beam against displacement relative to said housing in all directions while under the influence of the vibration and motion of the vehicle, said connection including a joint permitting limited sliding motion between said beam and said suspending means in a direction parallel to the length of said beam thereby permitting said beam to expand and contract longitudinally independently of said housing and said suspending means under the influence of varying temperatures experienced during the operation of the exhaust purifier.

References Cited in the file of this patent

UNITED STATES PATENTS

| | | |
|---|---|---|
| 1,415,418 | Wachtel | May 9, 1922 |
| 1,522,111 | Franck Philipson | Jan. 6, 1925 |
| 1,766,945 | Riehm | June 24, 1930 |
| 1,772,746 | Cook | Aug. 12, 1930 |
| 1,824,078 | Fischer | Sept. 22, 1931 |
| 1,867,325 | Neville | July 12, 1932 |
| 2,317,449 | Flock | Apr. 27, 1943 |
| 2,475,855 | Peters | July 12, 1949 |

FOREIGN PATENTS

| | | |
|---|---|---|
| 338,933 | Great Britain | Nov. 24, 1930 |
| 439,766 | Great Britain | Dec. 13, 1935 |